(12) United States Patent
Nuzzi et al.

(10) Patent No.: US 7,632,050 B2
(45) Date of Patent: *Dec. 15, 2009

(54) DRILLING TOOL AND METHOD FOR PRODUCING PORT SEALS

(75) Inventors: Joseph P. Nuzzi, Dover, OH (US); Rolf H. Kraemer, Edinboro, PA (US)

(73) Assignee: Allied Machine & Engineering Corp., Dover, OH (US)

( * ) Notice: Subject to any disclaimer, the term of this patent is extended or adjusted under 35 U.S.C. 154(b) by 461 days.

This patent is subject to a terminal disclaimer.

(21) Appl. No.: 11/306,755

(22) Filed: Jan. 10, 2006

(65) Prior Publication Data

US 2006/0222469 A1  Oct. 5, 2006

Related U.S. Application Data

(63) Continuation-in-part of application No. 10/642,056, filed on Aug. 15, 2003, now Pat. No. 6,984,094.

(51) Int. Cl.
*B23B 51/00* (2006.01)

(52) U.S. Cl. ............... 408/224; 408/713; 408/227

(58) Field of Classification Search ............ 408/59, 408/223–225, 227, 230, 713, 189, 191, 229
See application file for complete search history.

(56) References Cited

U.S. PATENT DOCUMENTS

| 599,537 | A | * | 2/1898 | Steudner ............... 408/223 |
| 3,018,675 | A | * | 1/1962 | Klages et al. ............... 408/189 |
| 3,610,768 | A | * | 10/1971 | Cochran ............... 408/204 |
| 4,197,042 | A | * | 4/1980 | Krhounek et al. ............... 408/200 |
| 4,422,812 | A | * | 12/1983 | Linville ............... 408/204 |

(Continued)

FOREIGN PATENT DOCUMENTS

DE    3602427 A1 *  7/1987

(Continued)

OTHER PUBLICATIONS

Metcut, "Port Contour Cutters," Catalog, Metcut p. 81; Metal Cutting Tools pp. 75, 80, 85, 86, (published by 2004).

(Continued)

*Primary Examiner*—Daniel W Howell
(74) *Attorney, Agent, or Firm*—Hahn Loeser + Parks LLP; Scott M. Oldham

(57) ABSTRACT

The present invention provides a new drilling tool useful in machining hydraulic port seals for fluid power ports. The drilling tool drills the port hole to size in a solid material for the minor thread diameter in combination with forming the port in a single operation. The drilling tool has a tool holder having a rotational axis, a first drilling insert having cutting surfaces on a first side and a mounting surface on a second side, at least one second drilling insert having a predetermined cutting surface portion and a mounting portion which is mounted on the holder at a location from the rotational axis of the holder. The at least one second drilling insert has first and second portions which engage and machine a work piece in a drilling operation to form a spot face and a seal form.

21 Claims, 7 Drawing Sheets

U.S. PATENT DOCUMENTS

| | | | |
|---|---|---|---|
| 4,505,626 A | 3/1985 | Benhase | |
| 4,531,867 A | 7/1985 | Benhase | |
| 5,071,295 A * | 12/1991 | Greig | 279/156 |
| 5,176,477 A | 1/1993 | Noggle | |
| 5,451,128 A * | 9/1995 | Hattersley | 408/204 |
| 5,722,803 A | 3/1998 | Battaglia et al. | |
| 5,863,161 A * | 1/1999 | Tayne et al. | 408/224 |
| 5,915,895 A * | 6/1999 | Jager et al. | 408/225 |
| 5,957,633 A | 9/1999 | Hall | |
| 6,033,161 A | 3/2000 | Scheufler, Jr. | |
| 6,379,088 B1 * | 4/2002 | Gruber et al. | 408/83.5 |
| 6,984,094 B2 | 1/2006 | Nuzzi et al. | |
| 7,226,250 B2 * | 6/2007 | Gatton et al. | 408/1 R |

FOREIGN PATENT DOCUMENTS

| | | |
|---|---|---|
| DE | 3610016 A1 | 10/1987 |
| JP | 06031517 A * | 2/1994 |
| WO | WO 9507787 A1 * | 3/1995 |

OTHER PUBLICATIONS

Dexport Tool Mfg. Co., "SAE Indexable Carbide Port Cutters," Catalog, http://www.dexport-tool.com/sae.html, 4 pages. (2001).

Dexport Tool Mfg. Co., "MS33649 Indexable Carbide Port Cutters," Catalog, http://www.dexport-tool.com/ms-33649. html, 3 pages (2001).

Walter Waukesha, Inc., "Port Contour Cutter B2074," Standard, 5 pages (Jan. 2002).

Society of Automotive Engineers, Inc., "Aerospace Standard" AS5202, 4 pages, (2001).

Society of Automotive Engineers, Inc., "Surface Vehicle Standard," J2244/1, 9 pages, (1991).

PCT International Search Report for International Application No. PCT/US03/25651, 4 pages, (Feb. 6, 2004).

* cited by examiner

DRILLING TOOL AND METHOD FOR PRODUCING PORT SEALS

This application is a continuation-in-part of U.S. non-provisional patent application Ser. No. 10/642,056 filed Aug. 15, 2003, which claims the benefit of U.S. Provisional Patent Application Ser. No. 60/404,091 filed Aug. 16, 2002, both hereby incorporated by reference.

TECHNICAL FIELD

The invention is directed to a drilling tool for use in production of predetermined hole geometries. More particularly, the invention is directed to a drilling tool useful in machining hydraulic port seals for fluid power ports.

BACKGROUND OF THE INVENTION

In typical drilling operations, a drilling tool is designed to configure a predetermined hole profile in a machining operation to facilitate particular applications. It is desired to form a predetermined configuration hole profile without secondary machining operations, and in a quick and efficient manner. The cutting or boring action of a drilling tool may be performed by an elongated, substantially cylindrical drilling tool, such as a combination of a tool holder and a drill insert attached thereto. Typically the cutting insert engages the material to be cut upon relative rotation between the tool and work piece. The use of cutting inserts allows for quick changing of the insert upon wear of the cutting surfaces, instead of replacement of the entire tool. Further, the use of cutting inserts allows one tool to be used for varying boring applications by changing the insert configuration instead of the entire drilling assembly.

In known port contour cutters for the above application, the tools are typically made of solid HSS, braised tipped carbide, indexable carbide inserts or replaceable carbide inserts. In known configurations and prior methods of forming port holes have generally required multiple machining operations. For example, the manufacturer of a port hole has typically required a first step of spot drilling the port hole, thereafter pre-drilling the port hole and a third operation to size the minor thread diameter and form the port hole. This operation typically encompassed the following after pre-drilling: (1) ream and then use a form tool with a pilot for the port form, and (2) ream and port form combination tool, with the reamer used as a pilot. It would therefore be desirable to provide a drilling tool and method which will drill the port hole to size in a solid material for the minor thread diameter in combination with forming the port in a single operation. Further, in known configurations, the tools are radially non-adjustable, and axial adjustment can only be accomplished by adjusting the stick-out of the cutting tool in the holder. It would be an advantage to provide a port contour cutter which allows radial and axial adjustment in a simple and effective manner.

SUMMARY OF THE INVENTION

Based upon the foregoing, the present invention provides a novel drilling tool and method which overcomes limitations found in the prior art, and enables the efficient and effective production of port holes. It is therefore an object of the invention to provide a drilling tool comprising a port contour cutter which allows machining of a port hole to produce the minor thread diameter and the port form in a single operation. In general, the drilling tool according to the invention comprises a tool holder having a rotational axis, with which drilling inserts are selectively mounted. A first drilling insert having cutting surfaces on a first side, and a mounting surface on a second side thereof, is selectively mounted along the rotational axis of the tool holder. At least one second drilling insert having a predetermined cutting surface portion and a mounting portion is selectively mounted with the holder at a predetermined outboard location from the rotational axis of the holder. The at least one second drilling insert is non-indexable. The invention also provides a method of drilling a port hole configuration to produce the minor thread diameter and the port form in a single operation.

These and other objects and advantages of the invention will become apparent upon a reading of the description of an embodiment thereof, in conjunction with the drawings.

DETAILED DESCRIPTION OF THE INVENTION

Figure 1:
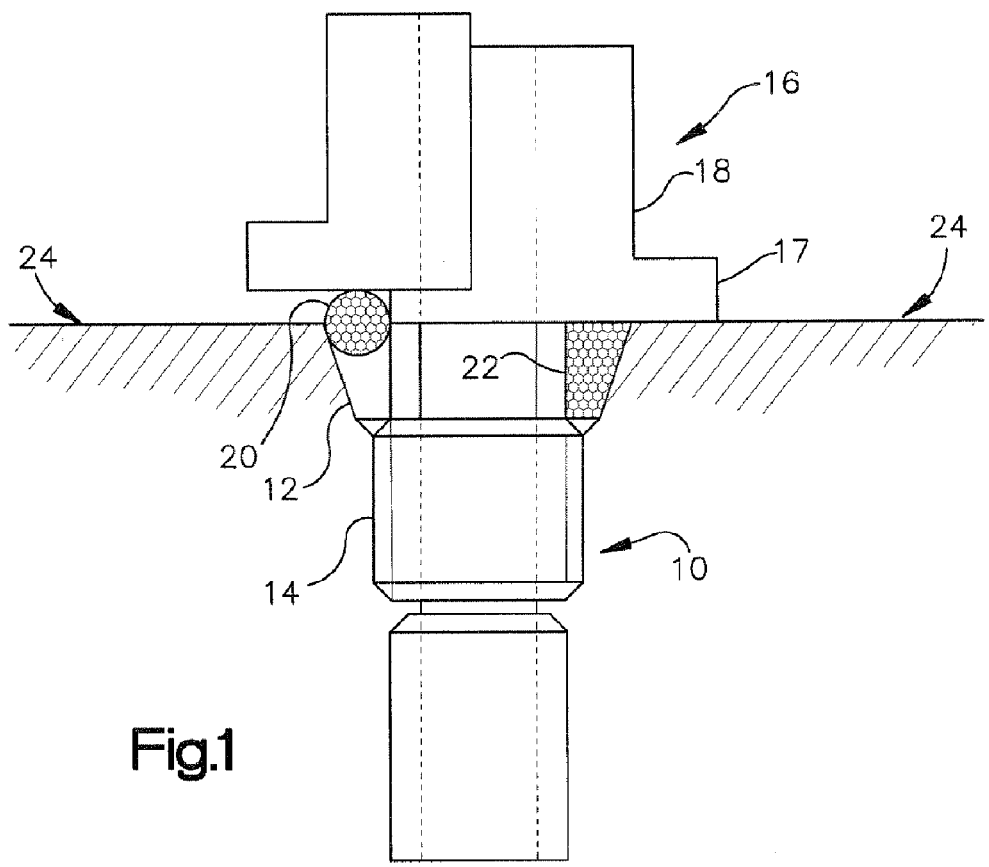
FIG. 1 is a schematic representation of a port hole configuration having a connector coupled therewith, such as a hydraulic port seal connection as found in the prior art.

In one particular type of application, for a fluid port seal which is threadably engaged with a hydraulic or other fluid line and sealed by means of an o-ring, requires a particular type of hole profile. As seen in FIG. 1, the shape of a fluid power port, such as a hydraulic porthole 10, uses a truncated or tapered hole 12 leading into a threaded hole 14. A hydraulic connector to the porthole 16 is positioned above the port taper 12 as shown at 18, and includes a flange 17 which bottoms out against the face of the work piece. Below the flange 17 are typically straight threads (not shown) formed on the connector, which engage the cylindrical, threaded hole at 14. To provide a seal for the connector 16, an o-ring 20 is provided in association with an undercut 22 formed in the connector, which mates with the tapered portion of the hole 12, providing a seal seat for properly sealing the port. Different threads may be used in association with the connector 16, and the configuration of the machined tapered hole remains substantially consistent except for the provision of alternative threading configurations. For example, in practice, both imperial straight threads and metric straight threads may be used with a hydraulic port, with other dimensions typically provided in metric dimensions. To identify a metric thread porthole, the porthole may be produced with an identification ridge 24, allowing simple and effective identification that the port thread is metric.

Figure 4:
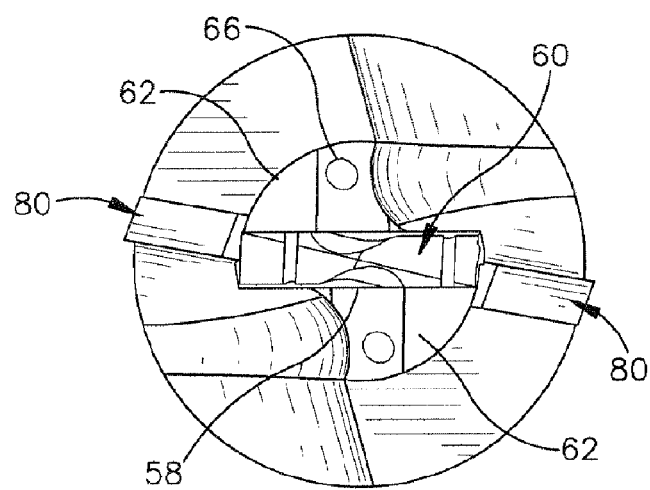
FIG. 4 is a top view of the tool as shown in FIG. 2.
Figure 2:
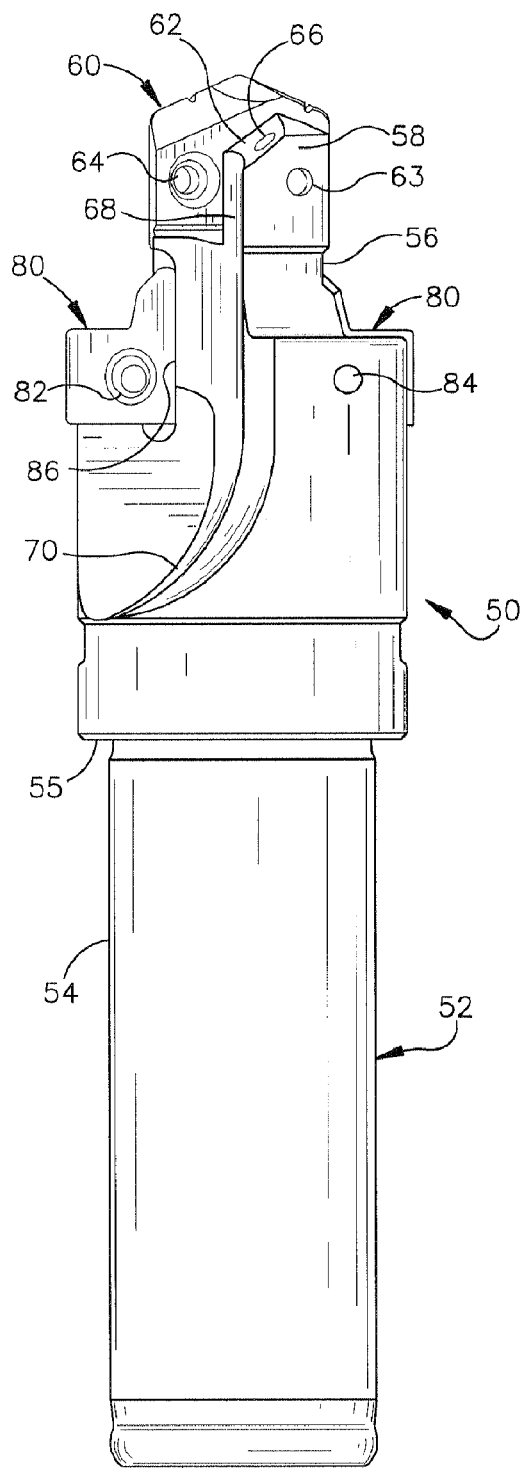
FIG. 2 shows a side elevational view of an embodiment of the drilling tool according to the invention.
Figure 3:
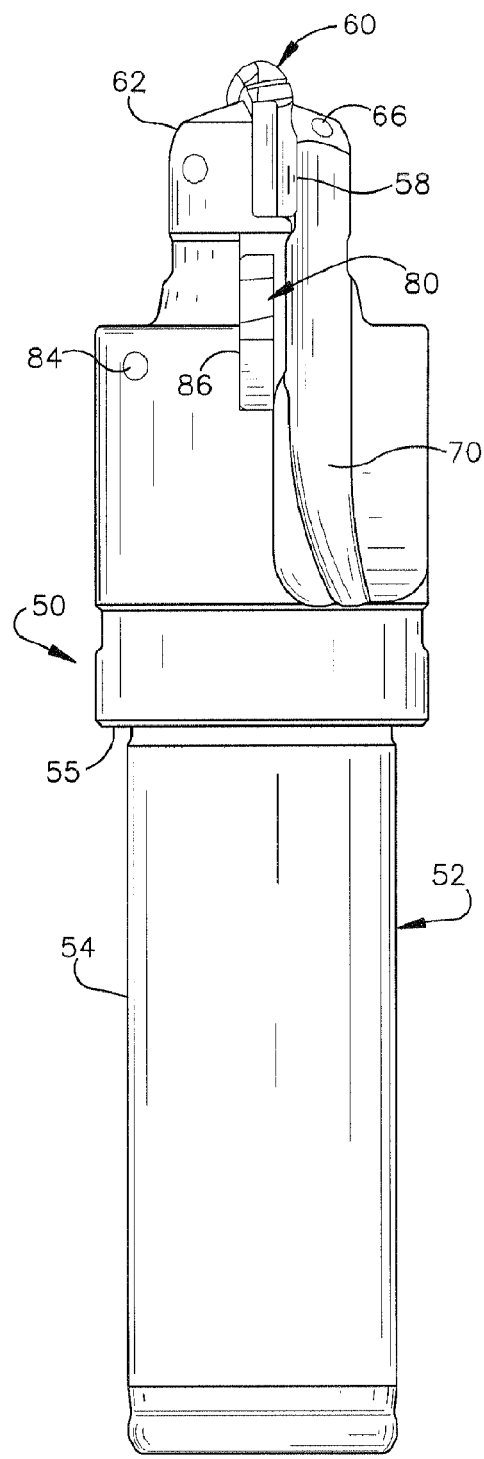
FIG. 3 shows a side elevation of the tool as shown in FIG. 2, rotated by 90°.

Turning now to an embodiment of the present invention, FIGS. 2-4 illustrate a drill tool assembly 50 for producing predetermined configuration holes in a work piece. Drill tool assembly 50 comprises a holder 52, having a shank portion 54 and a head portion 56 associated therewith. Within the head portion 56, a mounting slot 58 is formed at a central portion of the holder 52 to allow selective mounting of a first drilling insert 60 along the rotational axis of the holder 52. The slot 58 may be configured to have a bottom wall positioned in substantially perpendicular orientation relative to the rotational axis of the holder 52, and may include a locating boss or pin (not shown), positioned precisely with respect to the rotational axis, for proper positioning of insert 60 along the rotational axis. The configuration of the tool holder 52 with respect to the mounting slot 58 may be generally similar to the tool holder and drill insert configuration such as produced by Allied Machine & Engineering Company, such as in the T-ATM drilling system. The drilling insert 60 is therefore precisely positioned with respect to the holder 50, to perform the desired drilling function in conjunction therewith.

The holder 52 in this embodiment is shown to have a straight round shank leading to a ground qualified shoulder 55. The shank may be manufactured without a locking flat to be usable with hydraulic chucks, heat shrink holders or collet chucks, to gain higher dimensional accuracy, concentricity and balance. Alternatively a locking flat may be formed in the holder 52. Alternative configurations of holder 52 are contemplated, such as with alternative shank configurations to adapt to a particular machine spindle, such as CAT, BT, HSK, KM, ABS or the like. Precision holders may have a qualified length to the face, which in turn requires a ground shoulder on the cutting tool that is qualified, but again other configurations are contemplated.

The insert 60 is securely mounted in association with head portion 56 by means of clamping arms 62 having apertures 63, which can accommodate screws or other fasteners to secure the drill insert 60, having corresponding apertures 64. Each of the clamp arms 62 may also include a coolant or lubrication vent 66, which allows the application and flow of a coolant or lubricant adjacent the cutting surfaces of the drill insert 60, to facilitate the drilling operation. The vents 66 allow a liquid or air coolant/lubricant to be introduced to the hole bottom through the tool holder body 52. The liquid or air coolant helps to transport machined cuttings from the hole bottom, as well as cool the drill inserts at and from the bottom of the machined hole. Alternatively, an external coolant supply may also be used if desired. The clamp arms 62 may also include angled or curved surfaces 68, which facilitate chip removal via chip evacuating grooves 70 on each side of the holder 52.

In the embodiment of the invention, there is also provided at least one second drill insert 80 coupled to the drill holder 52 at a predetermined position. In the embodiment as shown in the figures, at least one second insert 80 comprises a pair of such inserts mounted on opposing sides of the holder 52. The insert 80 includes a mounting aperture 82 corresponding to a mounting aperture 84 formed in the holder 52. The holder 52 is formed with insert seats 86, which precisely mount the inserts 80 in relation to the rotational axis of holder 52, in a non-indexable manner. This can be seen in FIG. 2, and similar to the mounting configuration of insert 60, the mounting holes 82 formed in inserts 80 may be of tapered configuration, and slightly offset from the apertures 84 formed in the tool holder, to selectively bias the insert against the insert seat 86, for positive and precise mounting thereof. The connection of the inserts 60 and 80 and other aspects of the tool holder 52, may be generally similar to tool holder and insert mounting configurations as used in the Allied Machine & Engineering tools mentioned previously, or such as described in co-owned U.S. Pat. No. 5,957,635, which is hereby incorporated by reference herein. The inserts 60 and 80 may be made of a sintered metallic hard material such as carbide, cermet, ceramic, monocrystalline and polycrystalline diamond, or boron nitride as examples. Alternatively, high speed steel or other materials may be used.

Figure 5:
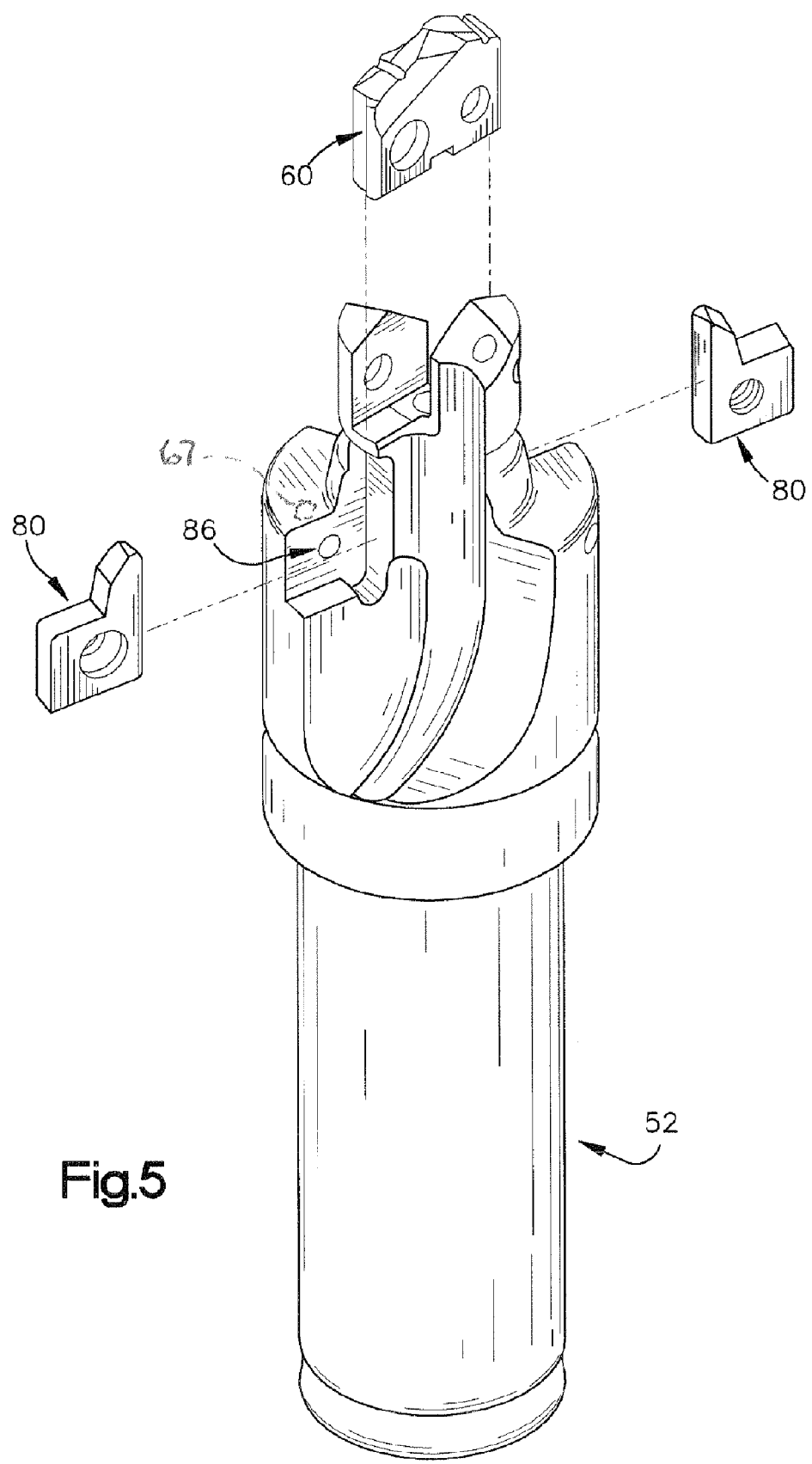
FIG. 5 is a partial exploded view showing the tool holder and drilling inserts according to an embodiment of the invention.
Figure 6:
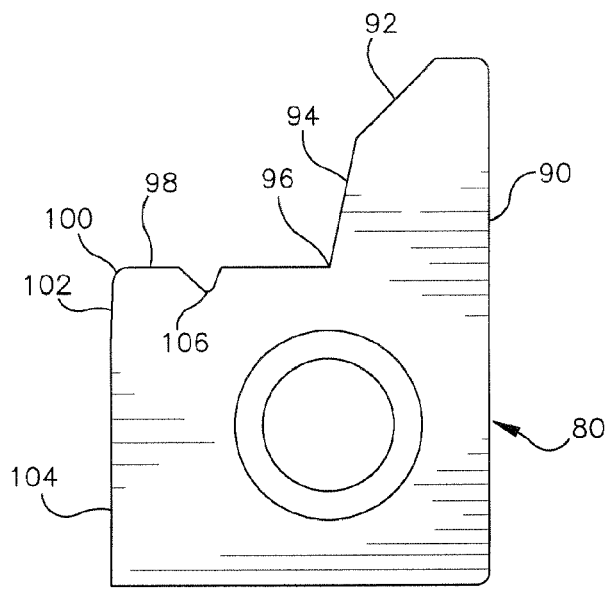
FIG. 6 is a side elevation view of a port form insert according to an embodiment of the invention.
Figure 8:
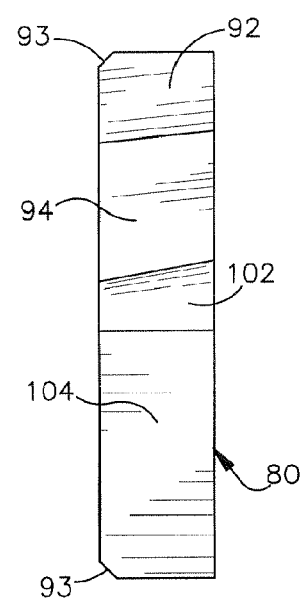
FIG. 8 is a side view of the port form insert as shown in FIG. 6.
Figure 7:
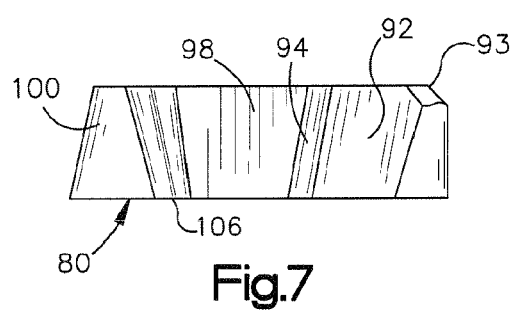
FIG. 7 is a top view of the port form insert as shown in FIG. 6.
Figure 9:
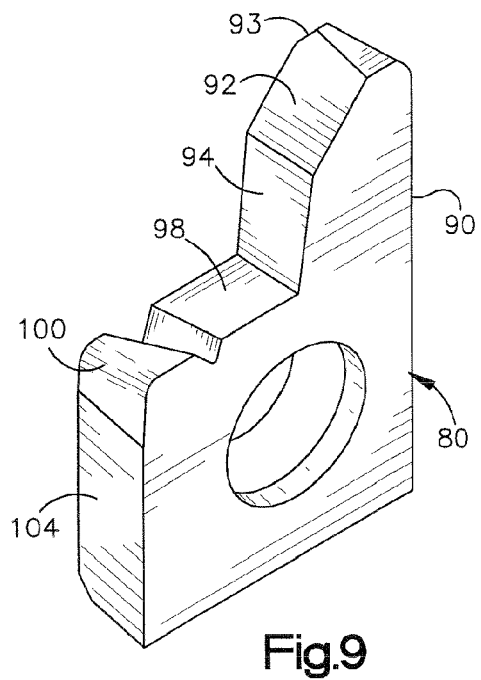
FIG. 9 is a perspective view of the port form insert as shown in FIG. 6.

The various inserts 60 and 80 in relation to the tool holder 52 are shown in FIG. 5. Using a single-sided inserts 60 and 80 in conjunction with tool holder 52, allows each of the inserts to be selectively removed and replaced in a simple and effective manner upon wear of the inserts during a drilling operation. The drill insert 60 performs a primary drilling operation, and may comprise the T-A™ drill insert produced by the Allied Machine & Engineering Company. The drill insert 60 in conjunction with tool holder 52, will produce the minor diameter for the thread size required for production of a hydraulic port seal or other connection for fluid power ports, or for other possible applications. The depth for this minor diameter portion of the machined work piece is generally dictated by the port specification, but can also be changed to suit the application and produced as a special tool for a desired depth.

In the drilling tool 50, a port form portion comprises the at least one second insert 80, or as shown in this embodiment of the invention, two opposing form inserts 80 mounted on tool holder 52. Using two effective/opposing form inserts 80 for the task of producing the port form in a machined work piece in conjunction with the minor diameter machine hole formed by insert 60, may enhance formation of both the minor thread diameter and port form in a single operation. In this way, the present invention provides a drilling system which does not require pre-drilling, and will therefore save set up in production time as well as tool cost associated with a pre-drilling operation. The replaceable inserts associated with the drilling system 50 will therefore not require braised carbide re-tipping or regrinding, which can result in size loss or the need to reset tool parameters. The use of precisely machined inserts 60 and 80 allow repeatability in the machining operation, and allow the user to select drill speeds and feeds according to coated carbide or coated HSS drill recommendations as an example. As the machining operation of the minor thread diameter and port form is performed at the same time, drill speeds can be set to the drill diameter and not a spot faced diameter, as a spot face operation performed by the insert 60 is of short duration and does not produce enough heat to damage the port form insert spot face area. By coating inserts 60 and 80 with materials, such as titanium aluminum nitride (TiAlN), diamond or the like, the tool will have a longer life, and replacement of the insert 60 and 80 is simple and efficient. It has also been found that the combination of the drill insert 60 with the at least one second insert 80 provides a drill system which is stabilized during the drilling operation, particularly when the port form inserts 80 are engaged in the work piece. Proper stabilization provides excellent surface finish and accuracy in the machined work piece. The drilling tool system also allows the drilling operation to be performed without dwell, so that the spot face area cannot start scraping to produce chatter or bad surface finish in the machined hole. In the drilling operation, the holder 52 can be made to rotate a sufficient degree to clean up the spot face surface prior to retraction of the holder 52.

In the drilling system 50, the provision of a pair of second inserts 80 allows the feed rate per insert to be the same as the feed rate per flute for the drill system 50, such that the feed rate per edge equals the feed rate per revolution divided by two. As shown in FIG. 5, the insert seats 86 are located relative to the drill insert 60 mounting location in a predetermined manner. In the embodiment shown, the seat 86 location is rotated approximately 15° below the drill insert 60 location. This will enhance tool life of the drilling system 50 in that chip flow coming from the drill insert 60 will not hit the port form inserts 80, which could cause possible damage to the cutting surfaces of inserts 80. Further, the chip flow coming from the inserts 80 will not interfere with the chip flow from the drill insert 60, ensuring good chip evacuation from both inserts 60 and 80. In a preferred form, the angle of rotation, such as approximately 15°, is in-line with the axis of the tool, which opens the chip gullet and prevents clogging of the chips that could choke the drill system 50. Also, the rotation of the inserts may offset the multi-directional tool and cutting forces, decreasing harmonic vibrations and drill chatter. Although the rotation of the inserts 80 approximately 15° has been found to work effectively, the inserts may also be positioned without any rotation or at other rotation angles, such as between 5°-25° for example.

Turning to FIGS. 6-9, an embodiment of the replaceable insert 80 is shown in more detail. As seen in these Figs., the insert 80 is generally of rectangular plate form, allowing simple and cost effective manufacture of the inserts 80, along with simple and cost effective formation of the pockets or seating surfaces 86 in the holder 52. These aspects are similar for insert 60, wherein each of the insert 60 and 80 allow precise repeatability of inserts having substantially identical characteristics. The inserts 60 and 80 are also replaceable, and non-indexable, to avoid problems of indexable inserts known in the prior art. For example, indexable inserts may have one side manufactured wrong, making the entire insert scrap. Alternatively, after a first side of an indexable insert is used, it can be easily mislocated or be rendered unusable due to edge build up, chipped edges and/or broken edges caused by the initial drilling operation. Providing simply manufactured inserts 60 and 80, which are non-indexable, but easily replaceable, allows for a more cost effective operation than in the use of indexable inserts.

In the present invention, it may be desirable to hone a sharp edge formed on the insert 80, which could result in chipping, such as by dry bead blast honing or other suitable method. The hone may aid the adherence of a coating and prolonged tool life, as well as void chipping under certain applications. At the same time, certain applications may require a sharp edge, and such a sharp edge may be maintained in an un-honed and uncoated condition if desired. It may be desirable in an application in which honing is helpful, to provide a heavier hone at the spot facing edge and a lighter hone at the seal angle edge of the insert 80, as will be hereinafter described. The degree of honing may be compatible with the actual chip thickness produced by the cutting surfaces of insert 80.

The insert 80 in general has a configuration which will be described relative to the minor diameter 90. At a top portion of the insert 80 adjacent the minor diameter surface 90, a 45° chamfer 92 may be configured to lead into the seal angle cutting surface 94, which typically may be a 12-15° angled surface, but may be of another desired angle. A chamfered surface 93 may be provided along the rear seating surface of the insert 80 to correspond to the seating surfaces machined in the holder 52. The seal angle 94 terminates with a small corner radius at 96 leading to the spot face 98. The spot face 98 depth from the top of the insert is predetermined based upon port specifications or the like, and may be adapted for any particular application. At the outside of the spot face 98, a small corner radius 100 leads to a second angle 102 that shapes the outside wall of the spot face diameter at 104. The outside edge 104 of the insert 80 may be formed as a wiper edge that produces the inner diameter of the spot face, and may be configured to have a slight angle between 0 and 5°, which will allow a slight amount of material to be shaved from the machined surface as the tool cuts deeper so as to slightly enlarge the inner diameter and reduce burr in the finished hole. Other angles for the wiper edge 104 are contemplated.

The insert 80 may be referred to as a "full form" insert, or a "wrap around" insert which desirably has the capability to cut around corners and chamfers and blend all surfaces. In this way, a machined form is produced without burrs, witness marks, sharp edges or other surface defects. In the embodiment as shown in FIG. 6-9, there is noted an optional notch 106 which may be formed in the insert 80 to produce the identification ridge 24 (as seen in FIG. 1), to identify the port as metric.

In the manufacture of insert 80, by taking advantage of the port seal diameter desired for a particular application, and the spot face diameter tolerances, a single port form may accommodate several port sizes. The inserts 80 can be made from blanks, such that a single blank may accommodate more than one insert. The insert 80 may be coated by known suitable methods, with a desired coating based upon a particular application for the tool 50. As an example, an application in aluminum may desirably use a diamond film coating on the inserts 60 and 80, or other coating materials, such as titanium aluminum nitride, may be used.

The inserts 80 generally may not need additional coolant holes, as the cutting action performed thereby is of relatively short duration, and at the end of the drilling operation. Residual coolant from the hole being drilled, introduced by coolant holes 66 or an external coolant supply, may be sufficient for cooling the cutting surfaces of the inserts 80. If a through hole is provided, an outside source of coolant may be required. Although the use of coolant holes to supply coolant directly to the area of inserts 80 may not be necessary for certain applications, such additional coolant holes (shown in ghost at 67) could be provided if desired or needed for a particular application.

With the configuration of the inserts 80, several cutting surfaces are formed to produce desired machine surfaces in a work piece. The insert 80 will have two different areas producing two different types of material chips, from the seal form surface 94 as well as spot face surface 98. The seal form area cutting edge will enter the hole at an angle, such as between 12-15°, adjacent to the centerline. Due to this acute angle, the theoretical chip thickness will only be approximately 10-15% of the actual feed rate and the actual chip thickness not appreciably increased. In the spot face area, the cutting edge will approach the material at approximately 90° to the centerline and the theoretical chip thickness will be approximately 100%. In the embodiment shown in FIG. 2, as an example, the inserts 80 are placed above center in the holder 52 to slightly increase the cutting pressures and reduce and/or eliminate chatter and vibration.

Figure 10:
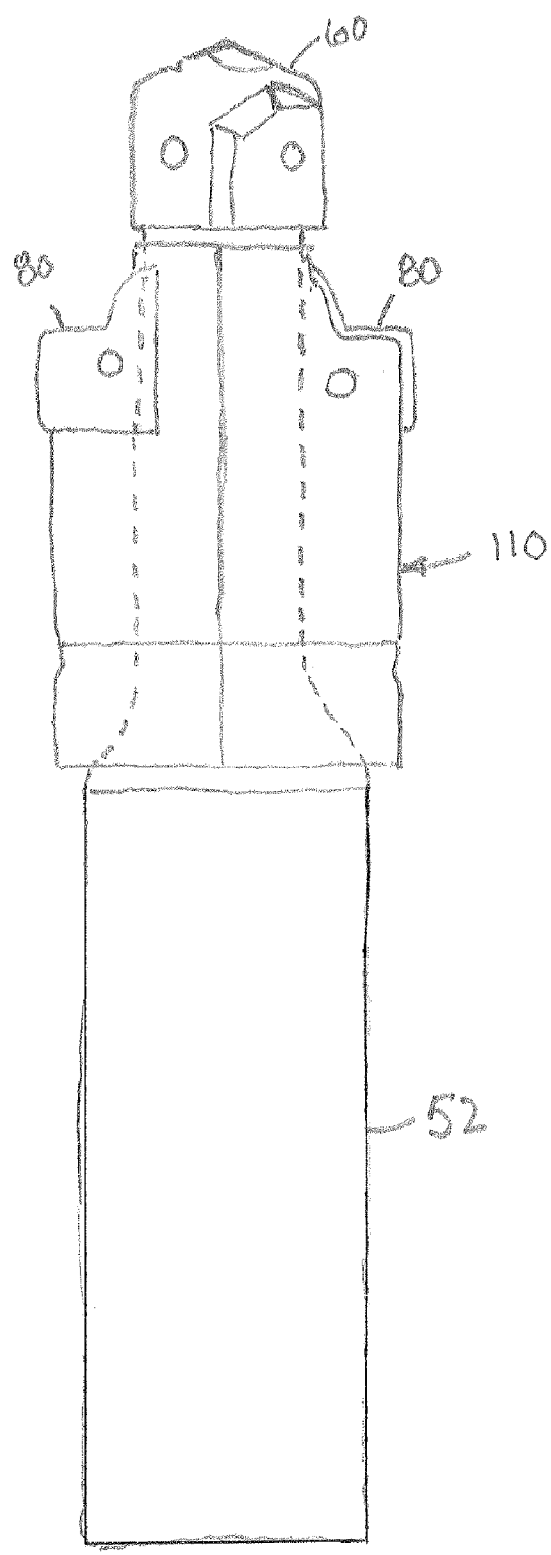
FIG. 10 is an elevational view of an alternate embodiment of the invention.

As an alternative embodiment, as shown in FIG. 10, and to provide radial and axial adjustment in the drilling system 50, the inserts 80 may be located on an independent cartridge 110 formed to be mountable with the holder 52. A plurality of such cartridges 110 allowing radial and axial adjustment of the relative positions of inserts 80 relative to the holder 52 and cutting insert 60. Cartridges 110 may be nested against three sides for proper positioning relative to the holder and other tool components, and fastened with a suitable fastener such as a screw. In this manner, the tool 50 may be fine tuned, even when mounted within a spindle for operation, in the case of spindle run-out or other problems a turning machine may have. Adjustment of the cartridges may be performed via shims, set screws or the like, to facilitate repositioning.

Figure 11:
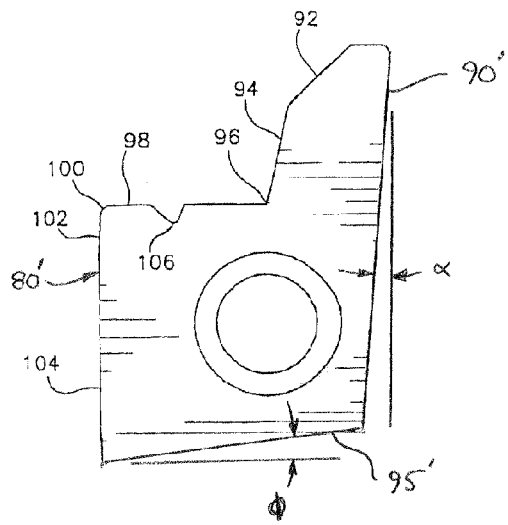
FIG. 11 is a side elevation view of a port form insert according to an additional embodiment of the invention.
Figure 12:
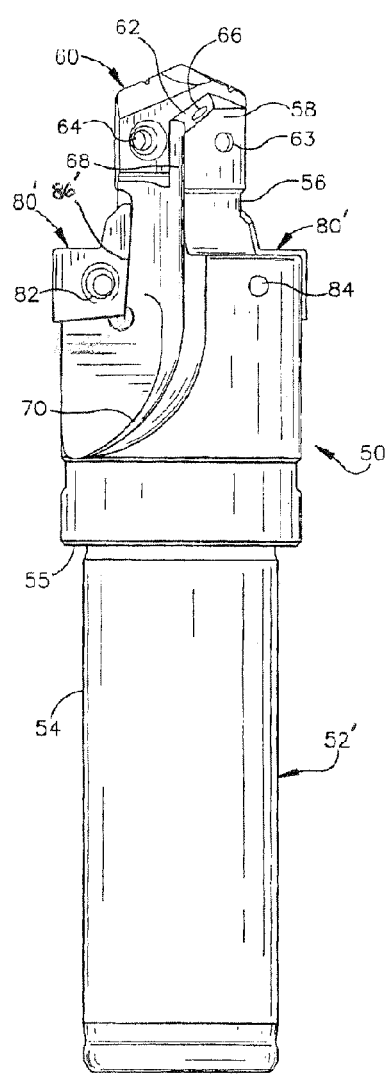
FIG. 12 is a side elevational view of a drilling tool using the port form insert of FIG. 11 of an additional embodiment according to the invention.
Figure 14:
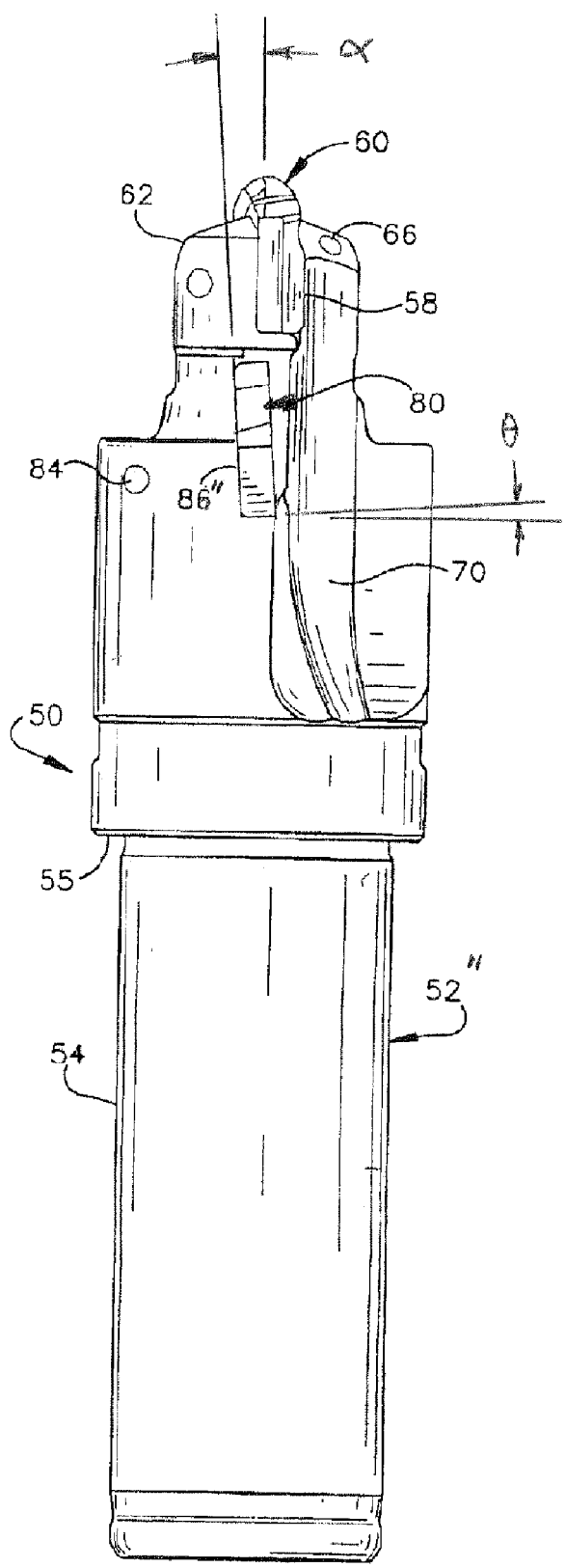
FIG. 14 is a side elevation of the tool as shown in FIG. 12, rotated by 90°.

An additional embodiment is shown in FIGS. 11 and 12 wherein the side register surfaces 90' and 95' of the insert 80' are angled as shown by acute angles α and φ respectively. The modified insert 80' is shown attached to angled seating surfaces 86' of the holder 52'. It is also contemplated that only one of the side register surfaces 90', 95' is angled while the other remaining as in the embodiment shown in FIG. 6. Still another variation is shown in FIG. 14, wherein the side register surfaces 90 and 95 of the insert 80 are positioned in seating surfaces that are tilted as shown by acute angles α and φ respectively. Although not shown, it is also contemplated that the seating surfaces 86 of the holder 52 and/or the side register surfaces 90, 95 of the insert 80 may have one or more locating ridges to properly position the insert 80 within the holder.

Figure 13:
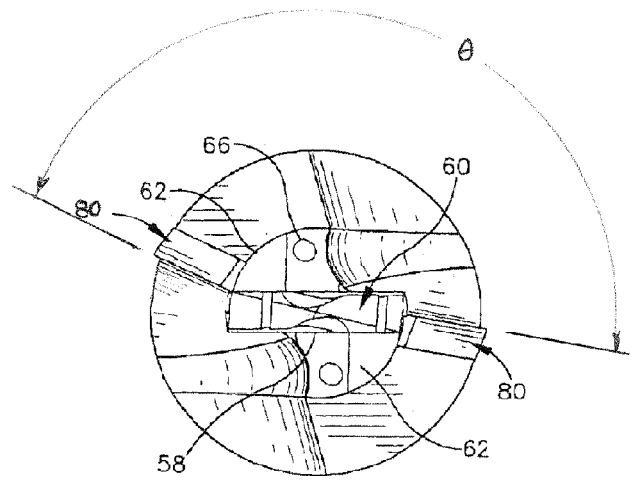
FIG. 13 is a top view of the embodiment of the drilling tool as shown in FIG. 12.

An additional embodiment is shown in FIG. 13. In this embodiment the seating surfaces 86" of the holder 52" are asymmetrically positioned with respect to the rotational axis of the holder 52" such that the circumferential distance represented by angle θ is less than one hundred eighty degrees. During operation, this varying distance between the inserts 80 causes the time between when the inserts engage the material to vary during cutting. Varying the circumferential spacing between the inserts 80 helps eliminate harmonics during cutting. For embodiments with three inserts, the angle between at least two sets of adjacent inserts would be other than one hundred twenty degrees and similarly for more inserts 80 and etc. for more inserts 80.

Although the present invention has been described above in detail relative to a particular embodiment thereof, the same is by way of illustration and example only, and is not to be taken as a limitation on the present invention. Accordingly, the scope and content of the present invention are to be defined only by the terms of the appended claims.

What is claimed is:

1. A drilling tool comprising:
    a tool holder having a first end, a second end, and an intermediate portion between the first end and the second end and a rotational axis therethrough, the second end comprising a shank portion, and the intermediate portion comprising at least two insert attachment seat portions;
    a first drilling insert being selectively attached to the first end of the holder; and
    at least two secondary drilling inserts attachable to the at least two insert seat attachment portions of the intermediate portion of the holder wherein each of the at least two secondary drilling inserts comprises at least four cutting edges adapted to form a port seal in a single cutting operation, a first register surface forming a seating surface for the at least two secondary drilling inserts, a second register surface forming a radially inward seating surface for the at least two secondary drilling inserts, and a third register surface forming a back seating surface in relation for the at least two secondary drilling inserts to the first register surface and the second register surface;
    wherein the first and secondary inserts are replaceable and non-indexable.

2. The drill tool of claim 1 wherein the at least two second drilling inserts are attached symmetrically about the rotational axis of the holder.

3. The drill tool of claim 1 wherein the at least two second drilling inserts are attached asymmetrically about the rotational axis of the holder.

4. The drill tool of claim 1 wherein said drilling inserts are made of a sintered metallic hard material selected from the group consisting of a carbide, a cermet, a monocrystalline diamond, a polycrystalline diamond, a boron nitride, and combinations thereof.

5. The drill tool of claim 1 further comprising a radius cutting portion adjacent the radial outward end of the second cutting edge leading to an angled cutting portion transverse to the first cutting edge of the at least one second cutting insert.

6. The drill tool of claim 1 wherein the first cutting edge of the at least two second inserts further comprises a notch for forming an identification ridge to identify said port.

7. The drill tool of claim 1 wherein the at least two second inserts are coated with titanium aluminum nitride, diamond, titanium carbo-nitride, aluminum chromium nitride, zirconium nitride, cubic boron nitride, or combinations thereof.

8. The drill tool of claim 1 further comprising at least one coolant hole formed in the holder to direct coolant toward the cutting edges of the at least two second inserts.

9. The drill tool of claim 1 wherein said at least two second inserts are located on an independent cartridge attachable to the intermediate portion of the holder, wherein a plurality of said cartridges are adapted to permit radial and axial adjustment of said at least two second inserts position relative to said holder and said first cutting insert.

10. A drilling tool comprising:
    a tool holder having a first end, a second end, and an intermediate portion between the first end and the second end and a rotational axis therethrough, the second end comprising a shank portion, and the intermediate portion comprising at least two insert attachment seat portions;
    a first drilling insert selectively attached to the first end of the holder; and
    at least two secondary drilling inserts attachable to the at least two insert seat attachment portions of the intermediate portion of the holder wherein each of the at least two secondary drilling inserts comprises at least four cutting edges adapted to form a port seal in a single cutting operation, a first side register surface, a second side register surface, and a third back register surface formed in relation to the first register surface and the second register surface;
    wherein the first and secondary inserts are replaceable and non-indexable.

11. The drill tool of claim 10, wherein said at least two secondary inserts are attached to the holder in positions equally spaced circumferentially about the holder from each other.

12. The drill tool of claim 10, wherein said at least two secondary inserts are attached to the holder in positions unequally spaced circumferentially about the holder from each other.

13. A drilling tool comprising:
    a tool holder having a first end, a second end, and an intermediate portion between the first end and the second end, and a rotational axis, the second end comprising a shank portion, and the intermediate portion comprises at least two insert attachment seat portions;

a first cutting member selectively attached to the first end of the holder; and at least two drilling inserts attachable to the insert seat attachment portions of the intermediate portion of the holder for forming a port seal in a single cutting operation, the drilling inserts each comprising a cutting face side opposite a register face side, and a plurality of side surfaces therebetween, the plurality of side surfaces comprising a first register side surface forming a bottom seating surface of each insert, a second register side surface forming a second seating surface of each insert, and each insert comprising a first cutting edge for forming the diameter of a counterbore, a second cutting edge for forming a bottom surface or spotface of the counterbore, a third cutting edge for forming a seal angle, and a fourth cutting edge for forming a chamfer, wherein each drilling insert is replaceable and non-indexable.

14. The drilling tool of claim 1, wherein the first register surface of at least one secondary insert is formed substantially parallel to the rotational axis of the tool.

15. The drilling tool of claim 1, wherein the first register surface of at least one secondary insert is an axially inward seating surface.

16. The drilling tool of claim 1, wherein the angle between the first register surface and the second register surface of at least one secondary insert is greater than about 90°.

17. The drilling tool of claim 14, wherein the angle between the first register surface and the second register surface of at least one secondary insert is greater than about 90°.

18. The drilling tool of claim 15, wherein the angle between the first register surface and the second register surface of at least one secondary insert is greater than about 90°.

19. The drilling tool of claim 10, wherein the first register surface of at least one secondary insert is formed at a first acute angle to the rotational axis of the tool.

20. The drilling tool of claim 10, wherein the second register surface of at least one secondary insert is formed at a second acute angle with a plane perpendicular to the rotational axis of the tool.

21. The drilling tool of claim 19, wherein the second register surface of at least one secondary insert is formed at a second acute angle with a plane perpendicular to the rotational axis of the tool.

\* \* \* \* \*